United States Patent
Sung et al.

(10) Patent No.: US 8,175,010 B2
(45) Date of Patent: May 8, 2012

(54) SYSTEM AND METHOD FOR PROVIDING SIMULTANEOUS MULTIPLE PUSH-TO-TALK OVER CELLULAR MULTIMEDIA SERVICE

(75) Inventors: Sang-Kyung Sung, Seoul (KR); Hyeon-Cheol Pu, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1307 days.

(21) Appl. No.: 11/529,049

(22) Filed: Sep. 28, 2006

(65) Prior Publication Data

US 2007/0076660 A1  Apr. 5, 2007

(30) Foreign Application Priority Data

Sep. 30, 2005 (KP) .................. 10-2005-0092256

(51) Int. Cl.
*H04L 5/16* (2006.01)
*H04B 1/38* (2006.01)

(52) U.S. Cl. .................. 370/260; 370/296; 455/90.2

(58) Field of Classification Search .................. 370/230, 370/235, 260, 296, 310, 312, 328, 338, 401, 370/412; 455/90.2, 412.2, 413, 415–418, 455/422.1, 423, 433, 435.1, 466, 510, 517–521; 709/201–207, 226–229, 245, 249

See application file for complete search history.

(56) References Cited

U.S. PATENT DOCUMENTS

| | | | |
|---|---|---|---|
| 6,038,459 A | 3/2000 | Searle et al. | |
| 6,606,306 B1 * | 8/2003 | Lin et al. | 370/261 |
| 6,738,617 B2 * | 5/2004 | Rosen et al. | 455/418 |
| 6,744,741 B1 * | 6/2004 | Ju et al. | 370/260 |
| 6,792,092 B1 * | 9/2004 | Michalewicz | 379/202.01 |
| 7,200,396 B2 * | 4/2007 | Kauppinen | 455/435.3 |
| 7,537,852 B2 | 5/2009 | Hamamoto et al. | |
| 2002/0086665 A1 * | 7/2002 | Maggenti et al. | 455/416 |
| 2003/0223381 A1 * | 12/2003 | Schroderus | 370/285 |
| 2004/0125802 A1 * | 7/2004 | Lillie et al. | 370/390 |
| 2004/0224710 A1 * | 11/2004 | Koskelainen et al. | 455/518 |
| 2005/0026558 A1 | 2/2005 | Stura et al. | |
| 2005/0034079 A1 * | 2/2005 | Gunasekar et al. | 715/753 |
| 2005/0105511 A1 | 5/2005 | Poikselka | |
| 2005/0122922 A1 * | 6/2005 | Wu et al. | 370/310 |
| 2005/0124365 A1 * | 6/2005 | Balasuriya et al. | 455/518 |

(Continued)

FOREIGN PATENT DOCUMENTS

JP  2001-527247  12/2001

(Continued)

OTHER PUBLICATIONS

"OMA PoC Control Plane", Open Mobile Alliance, p. 36, Mar. 8, 2005.

*Primary Examiner* — Chi Pham
*Assistant Examiner* — Prince Mensah
(74) *Attorney, Agent, or Firm* — The Farrell Law Firm, P.C.

(57) ABSTRACT

A system and method provide simultaneous multiple push-to-talk (PTT) over cellular (PoC) multimedia service, and enable a PoC client performing an OMA PoC multimedia communication service to be simultaneously provided with a plurality of media streams, and also allows efficient media transmission through media adaptation adjusting capacity of each of the media streams provided at the same time.

13 Claims, 9 Drawing Sheets

U.S. PATENT DOCUMENTS

| | | | |
|---|---|---|---|
| 2005/0136952 A1* | 6/2005 | Zabawskyj et al. | 455/466 |
| 2005/0190740 A1* | 9/2005 | Zhao et al. | 370/349 |
| 2005/0232406 A1* | 10/2005 | Kauppinen | 379/202.01 |
| 2005/0238000 A1* | 10/2005 | Pollock et al. | 370/352 |
| 2005/0281208 A1* | 12/2005 | Dorenbosch et al. | 370/270 |
| 2006/0034260 A1* | 2/2006 | Svedberg et al. | 370/352 |
| 2006/0046757 A1* | 3/2006 | Hoover et al. | 455/518 |
| 2006/0046758 A1* | 3/2006 | Emami-Nouri et al. | 455/518 |
| 2006/0084455 A1* | 4/2006 | Schwagmann et al. | 455/518 |
| 2006/0111134 A1* | 5/2006 | Mills | 455/518 |
| 2006/0293073 A1* | 12/2006 | Rengaraju et al. | 455/518 |
| 2007/0021133 A1* | 1/2007 | Coulas | 455/518 |

FOREIGN PATENT DOCUMENTS

| | | |
|---|---|---|
| JP | 2004-187170 | 7/2004 |
| JP | 2004-193809 | 7/2004 |
| WO | WO 2005/062569 | 7/2005 |

* cited by examiner

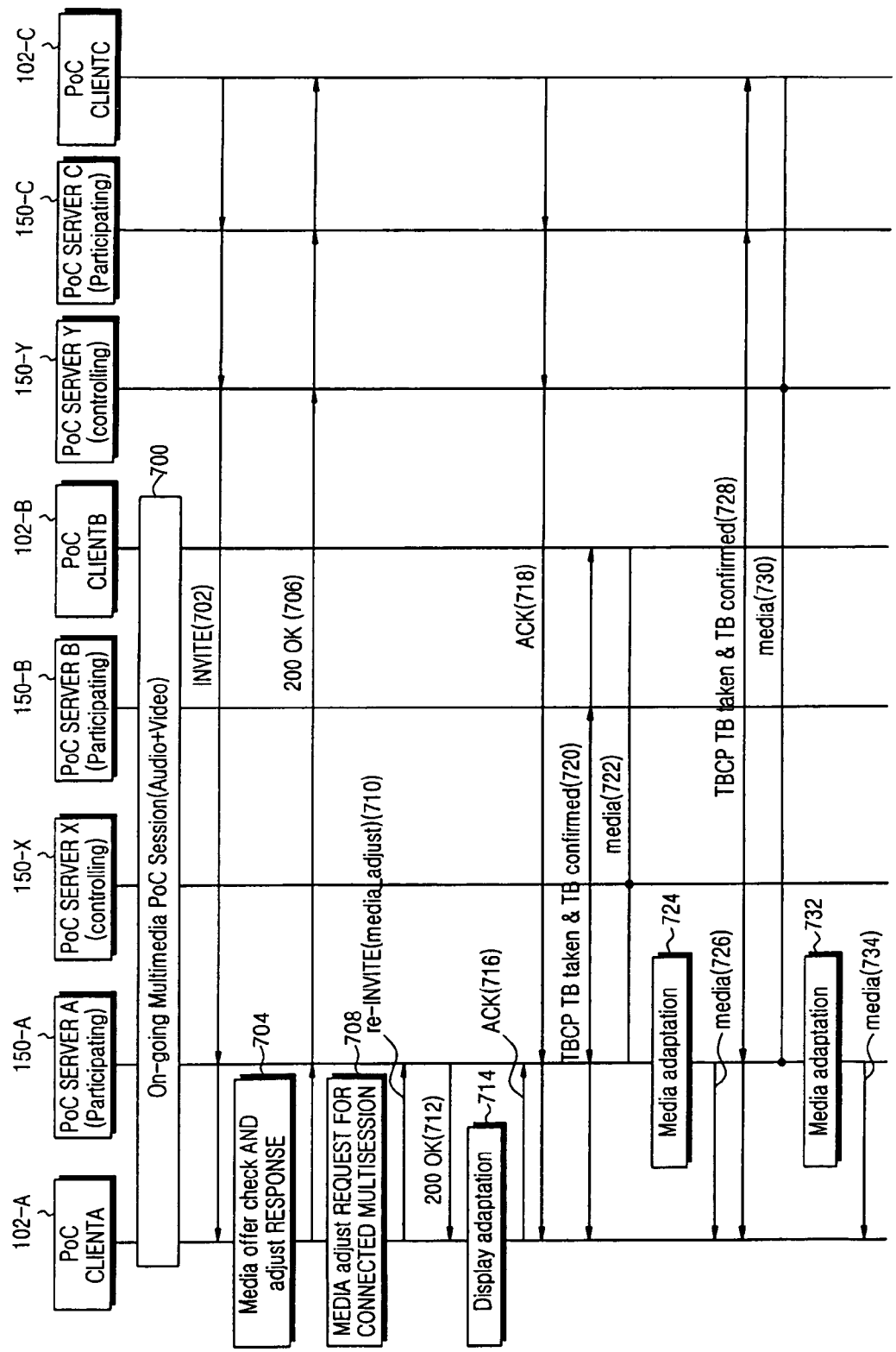

FIG. 8 re-INVITE sip:PoC_SS_Conf1@example.domain_a.com SIP/2.0
Via: SIP/2.0/UDP client_apc.domain.com;branch=z9hG4bKnashds7
From: <sip:client_a@domain_a.com>;tag=71192
To: <sip:poc_serv_A@example.domain_x.com>;tag=90086
Call-ID: ssky831abc@client_apc.domain.com
CSeq: 2 re-INVITE
Max-Forwards: 68
Supported: timer
Allow: INVITE,ACK,CANCEL,BYE,UPDATE,REFER,MESSAGE
Accept:application /sdp,message/sipfrag
Accept-Contact: *;+g.poc.talkburst;require;explicit
Content-Type: multipart/mixed
Content-Length: <...> v=0
o=- 27 29 IN IP6 9900::aaa:bbb:ccc:ddd
c=IN IP6 9900::aaa:bbb:ccc:ddd
m=audio 4455 RTP/AVP 98
a=rtpmap:98 EVRC/8000
a=rtcp:4460
m=video 51372 RTP/AVP 31
a=rtpmap: 31 AVC
m=application 20000 udp TBCP
a=fmtp:TBCP queuing=1; tb_priority=3; mb_adapt=2

------boundary1
<XML doc>
---
</XML doc>

FIG. 9

| V=2 | P | 110101 | PT=APP=204 | length=X |
|---|---|---|---|---|
| SSRC of PoC Server performing the Participating PoC Function ||||
| name(ASCII)=PoC Release Ver. ||||
| Media Adaptation Type ||||
| SDES item content || Padding Bits ||
| || Additional information ||
| SDES items ||||

SYSTEM AND METHOD FOR PROVIDING SIMULTANEOUS MULTIPLE PUSH-TO-TALK OVER CELLULAR MULTIMEDIA SERVICE

CLAIM OF PRIORITY

This application claims the benefit under 35 U.S.C. §119(a) from an application entitled "SYSTEM AND METHOD FOR PROVIDING SIMULTANEOUS MULTIPLE PUSH-TO-TALK OVER CELLULAR MULTIMEDIA SERVICE" filed in the Korean Intellectual Property Office on Sep. 30, 2005 and assigned Serial No. 2005-92256, the entire contents of which are incorporated herein by reference.

BACKGROUND OF THE INVENTION

1. Field of the Invention

The present invention relates to a system and method for providing simultaneous multiple push-to-talk (PTT) over cellular (PoC) multimedia service.

2. Description of the Related Art

Significant developments in mobile communications technology and the extension of mobile communications networks have resulted in the development of a vast array of services and applications for use with a cellular phone.

Concurrently, there is an increasing demand from cellular phone users for additional services, such as a location, a multimedia, and a push-to-talk (PTT) service. Among these additional services, the PTT service supports various supplementary functions such as an instant messenger function and a status display, as well as a group call and a voice call which are also provided by an existing radio or a trunk radio system (TRS).

Currently, standardization of a PoC service which utilizes the PTT function in a mobile communication network is actively proceeding. One unique feature of the PoC service that differs from existing mobile communication services is that a user can participate in a plurality of PoC sessions, and so can use a call service while moving among the PoC sessions as needed. A requirement that the user should be able to use the call service while moving among the plurality of PoC sessions is specified in the Open Mobile Alliance (OMA), which is a forum for specifying mobile communications services.

Meanwhile, a current PoC system supports a multimedia communication service. To this end, the PoC system defines video, images, text, voice, etc. as a new type of multimedia. Further, the current PoC system can display a multistream (e.g. video or images) owing to improved performance of terminals.

However, the current PoC system is not capable of simultaneously transmitting a plurality of multimedia streams to a terminal during a multisession.

SUMMARY OF THE INVENTION

It is an object of the present invention to provide a system and method that provide simultaneous multiple push-to-talk (PTT) over cellular (PoC) multimedia service in a PoC system, capable of simultaneously transmitting a plurality of media streams to a PoC terminal during a multisession.

Another object of the present invention is to provide a system and method that provide simultaneous multiple push-to-talk (PTT) over cellular (PoC) multimedia service, capable of providing traffic control considering a capacity of a wireless network or system performance when a plurality of media streams are simultaneously transmitted to a PoC terminal during a multisession.

The present invention provides a method and system for making it possible to efficiently transmit media in consideration of features of the media so that a PoC client performing OMA PoC multimedia communication service simultaneously receives and displays visual media such as images and video.

According to the present invention, there is provided a method for providing simultaneous multiple push-to-talk-over-cellular (PoC) multimedia service in a PoC system. The method includes receiving a request for establishment of a new PoC multimedia session of a PoC terminal performing multimedia PoC service through a pre-established PoC session; checking whether the PoC terminal supports simultaneous multiple multimedia sessions and whether the PoC terminal requests media adaptation; adjusting sizes of multimedia data being transmitted and data to be transmitted to the PoC terminal according to whether the PoC terminal supports simultaneous multiple multimedia sessions and whether the PoC terminal requests media adaptation; and transmitting the adjusted data to the PoC terminal.

The step of checking whether the PoC terminal supports simultaneous multiple multimedia sessions and whether the PoC terminal requests media adaptation may includes checking whether an auto-answer mode of the PoC terminal is set up; and detecting pre-stored setup information about the PoC terminal when the auto-answer mode is set up, and checking whether the PoC terminal supports simultaneous multiple multimedia sessions and whether the PoC terminal requests media adaptation.

Also, the step of checking whether the PoC terminal supports simultaneous multiple multimedia sessions and whether the PoC terminal requests media adaptation may include transmitting a message querying whether the PoC terminal supports simultaneous multiple multimedia sessions and whether the PoC terminal requests media adaptation; and receiving a response message to the query message from the PoC terminal, detecting information included in the response message, and checking whether the PoC terminal supports simultaneous multiple multimedia sessions and whether the PoC terminal requests media adaptation.

According to another aspect of the present invention, there is provided a message used for providing simultaneous multiple push-to-talk-over-cellular (PoC) multimedia service. The message includes a Session Initiation Protocol (SIP) message having Talk Burst Control Protocol (TBCP) option parameters indicating whether media adaptation is requested, whether an uplink or downlink exists, and a type of media data.

According to yet another aspect of the present invention, there is provided an apparatus for providing simultaneous multiple push-to-talk-over-cellular (PoC) multimedia service in a PoC server. The apparatus includes a participating PoC function (PF) composer for managing a plurality of PoC multimedia sessions; a media adapter for adjusting a size of media data received through the PF composer and transmitted through the plurality of PoC multimedia sessions connected to one PoC terminal; and a media transmitter for transmitting the media data adjusted by the media adapter to the PoC terminal.

The plurality of PoC multimedia sessions connected to one PoC terminal may include at least one pre-established PoC multimedia session and a PoC multimedia session that is newly requested before the pre-established PoC multimedia session is terminated.

The media adapter may perform media adaptation on the media data transmitted to the PoC terminal that supports simultaneous multiple multimedia sessions and requests media adaptation.

The media adapter may refer to information on an auto-answer mode setup of a corresponding PoC terminal in order to check whether or not the corresponding PoC terminal supports simultaneous multiple multimedia sessions and whether the PoC terminal requests media adaptation.

The media adapter may perform query and response with a corresponding PoC terminal in order to check whether or not the corresponding PoC terminal supports simultaneous multiple multimedia sessions and whether the PoC terminal requests media adaptation.

According to yet another aspect of the present invention, there is provided a system for providing simultaneous multiple push-to-talk-over-cellular (PoC) multimedia service. The system includes a PoC terminal provided with a PoC service; and a PoC server for checking whether the PoC terminal supports simultaneous multiple multimedia sessions and whether the PoC terminal requests media adaptation when requested to establish a plurality of PoC multimedia sessions of the PoC terminal, adjusting a size of media data to be transmitted to the PoC terminal through the plurality of PoC multimedia sessions when the PoC terminal supports simultaneous multiple multimedia sessions and requests media adaptation, and transmitting the adjusted media data to the PoC terminal.

The PoC terminal may include a media transmitter for exchanging packet data with respect to the PoC server; a display controller for performing data processing for displaying the media data received through the media transmitter; and a display for receiving and displaying the display-processed data from the display controller.

BRIEF DESCRIPTION OF THE DRAWINGS

The above and other objects, feature and advantages of the present invention will be more clearly understood from the following detailed description, taken in conjunction with the accompanying drawings, in which:

FIG. 7 is a flow diagram of SIP-based signals between a PoC client and a PoC server in order to provide simultaneous multiple PoC multimedia service in accordance with a third embodiment of the present invention;

FIG. 8 illustrates an example of SIP-based MBCP MIME parameters used in the present invention;

FIG. 9 illustrates the format of an RTCP message transmitted through a PoC session in order for a PoC client to request media adaptation from a PoC server (Participating)

DETAILED DESCRIPTION OF THE PREFERRED EMBODIMENTS

Hereinafter, preferred embodiments of the present invention will be described in detail with reference to the accompanying drawings. The following description is illustrative of the case where the present invention is applied to a push-to-talk (PTT) system, particularly a PTT over cellular (PoC) system in which a PTT service is provided using a mobile communication network. Generally, the PoC system makes use of a Session Initiation Protocol (SIP) and an Extended SIP in order to transmit session participation information of a group PoC call, as well as an Extensible Mark-up Language (XML) Configuration Access Protocol (XCAP) in order to obtain information about a group. Thus, the functionality of the present invention to be described below can be realized by these protocols, and a basic construction of the present invention can be based on a PoC Rel. 1 system. Initially, an ordinary PoC system to which the present invention can be applied will be described.

Figure 1:
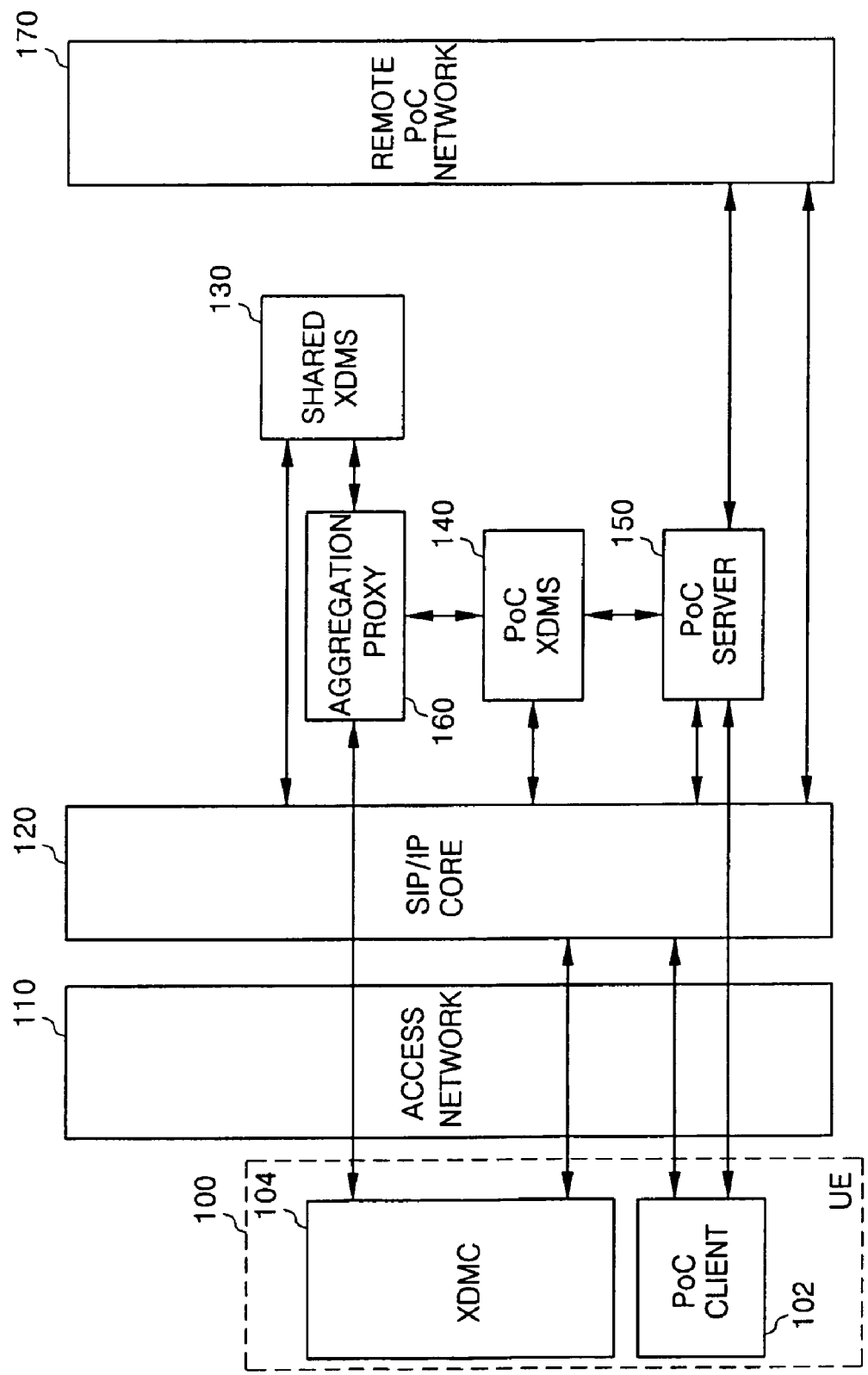
FIG. 1 illustrates a configuration of a conventional PoC system.

FIG. 1 illustrates architecture of an ordinary PoC service system and its relevant network.

As illustrated in FIG. 1, the ordinary PoC system includes user equipment (UE) 100 acting as a PoC terminal, XML Document Management (XDM) Servers (XDMSs) 130 and 140, and a PoC server 150. The PoC system may further include an aggregation proxy 160. These entities may be connected through an access network 110, a Session Initiation Protocol/Internet Protocol (SIP/IP) core 120, and a remote PoC network 170.

Each of these entities will be described below in detail.

The UE 100 includes a PoC client 102, and an XDM client (XDMC) 104.

The PoC client 102 is a service requester that is built into the UE 100 and performs network connection for providing a PoC service to a PoC service subscriber while residing in the UE 100. The PoC service subscriber may be provided with the PoC service through the UE in which the PoC client is built. Hereinafter, PoC client will be used as a generic name for a PoC terminal or a PoC service subscriber. Thus, no reference numeral is given to the PoC client, except where necessary to distinguish it particularly.

The PoC client mainly serves to establish a PoC session, participate in the established PoC session, and terminate the established PoC session from the viewpoint of the PoC service subscriber, i.e. the PoC user. In addition, the PoC client acts to create and transfer a talk burst, support an instant personal alert, and perform authentication when providing access to the PoC service. The PoC client can be connected to the SIP/IP core 120 that supports SIP and IP multimedia via the access network 110.

The SIP/IP core 120 is connected to the XDMSs 130 and 140 and the PoC server 150 in order to support the PoC service. At this time, the PoC server 150 performs a Controlling PoC Function for maintaining and managing the PoC session, or a Participating PoC Function for participating in the PoC session for a one-to-one PoC call or a one-to-many PoC call (or a group PoC call).

Meanwhile, the PoC service may accompany a service for establishing a group session such as a conference call. To this end, the OMA specification specifies XDMC 104 and the XDMSs 130 and 140 for a group list service. FIG. 1 illustrates the PoC XDMS 140 used for the PoC service, and the shared XDMS 130 commonly used in another service enabler. Information about a group and its members may be input into the XDMSs 130 and 140 through the PoC client. The PoC client may be aware of information about other PoC clients that can be retrieved through an individual or group list received from the XDMSs 130 and 140. Alternatively, creating, modifying and managing the group and its members with respect to the XDMSs 130 and 140 may be carried out through a communication network, such as the Internet or an Intranet, which a PoC service provider can trust. The protocols and details for the XDM, such as creating, modifying and deleting the group list, are well-known among those of skill in the art, and so their detailed description will be omitted.

Further, for the purpose of the group service, the aggregation proxy 160 routes a group list information request to each of the XDMSs 130 and 140 according to an appropriate rule when the group list relevant request is received from the XDMC 104.

Next, the PoC server 150 will be described.

Figure 2:
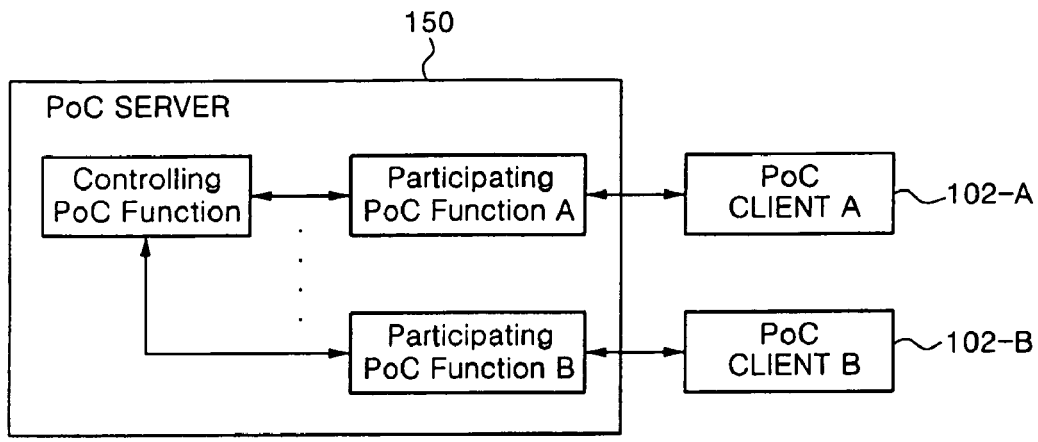
FIG. 2 illustrates a schematic configuration of a conventional PoC server.

FIG. 2 illustrates a schematic configuration of a general PoC server.

The PoC server 150 has a Controlling PoC Function (hereinafter "CF") for controlling overall maintenance and management of a PoC session, and/or a Participating PoC Function (hereinafter "PF") for controlling maintenance and management between each PoC session. Function-specific features of the PoC server will be described with reference to Tables 1 and 2.

TABLE 1

Controlling PoC Function (CF)

Provides centralized PoC session handling
Provides centralized Media distribution
Provides centralized Talk Burst Arbitration functionality including talker identification
Provides SIP session handling, such as SIP session origination, termination, etc.
Provides policy enforcement for participation in group sessions
Provides participant information
Collects and provides centralized media quality information
Provides centralized charging reports
May provide transcoding between different codecs
Supports Talk Burst Control Protocol Negotiation As in Table 1, the PoC server performing the CF (or the Controlling PoC server) manages a PoC session. In particular, the Controlling PoC server receives floor (or right-to-speak) requests from PoC clients, arranges an order in which to give the PoC clients the floor, and gives the PoC clients the floor in that order. The Controlling PoC server also distributes a talk burst for which an arbitrary PoC client makes a request, to all other PoC clients participating in a group PoC call, and provides information of the PoC clients participating in the group PoC call.

As in the following Table 2, the PoC server performing the PF (or the Participating PoC server) manages PoC sessions interconnected between the Controlling PoC server and each PoC client. In particular, the Participating PoC server acts to relay the floor between the PoC client and the Controlling PoC server when the PoC client requests the floor or when the Controlling PoC server gives the floor to the PoC client. In addition, the Participating PoC server serves to relay media between the Controlling PoC server and the PoC client, perform transcoding of different codecs used between the Controlling PoC server and the PoC client, and filter one of two concurrent PoC sessions according to the choice of a PoC user when there is simultaneous talking in the two concurrent PoC sessions.

TABLE 2

Participating PoC Function (PF)

Provides PoC session handling
May provide the Media relay function between PoC client and Controlling PoC server
May provide user media adaptation procedures
May provide the Talk Burst control message relay function between PoC client and Controlling PoC server
Provides SIP session handling, such as SIP session origination, termination, etc, on behalf of the represented PoC client
Provides policy enforcement for incoming PoC session (e.g. access control, incoming PoC session barring, availability status, etc.)
May collect and provide media quality information
Provides participant charging reports
May provide filtering of media streams in the case of simultaneous sessions
May provide transcoding between different codecs
May support Talk Burst Control Protocol Negotiation
Stores the current Answer Mode and Incoming PoC Session Barring preferences of the PoC client FIG. 3 is a schematic diagram illustrating CF and PF blocks of a PoC server.

Figure 3:
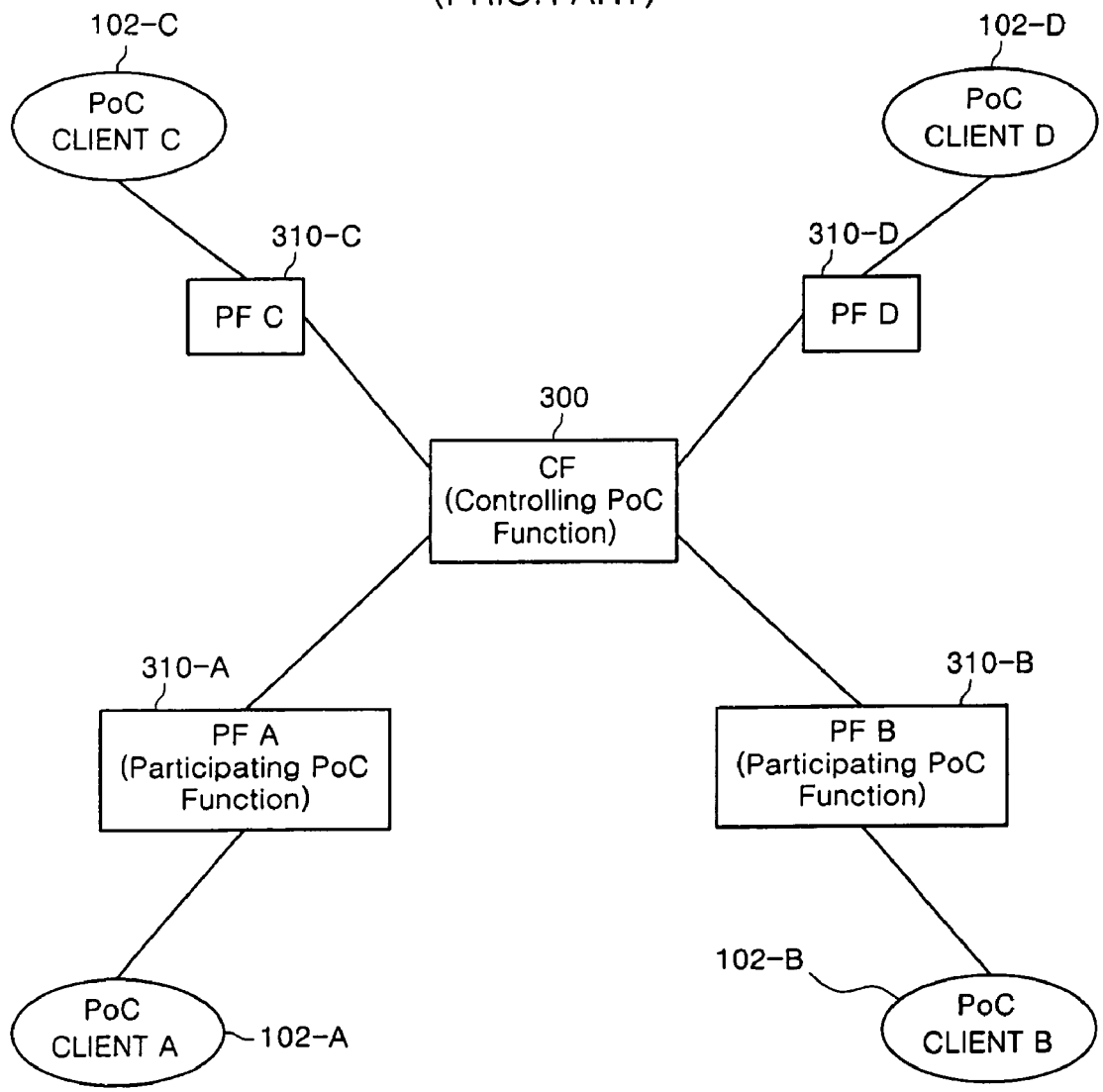
FIG. 3 is a schematic diagram illustrating CF and PF blocks of a PoC server.

Referring to FIG. 3, PoC clients 102-A through 102-D provide access to a CF 300 through PFs 310-A through 310-D respectively, thereby establishing a PoC session. Then, when the floor is granted from the CF 300 to the PoC client, media based on speech of the corresponding PoC client is transmitted to each PoC client. At this time, the PoC client who is granted the floor cannot appropriately speak until the PoC client confirms information of the other PoC clients participating in the PoC group session.

Meanwhile, a call processing technique for call connection in the PoC system allows for various procedures according to requirements and situations of originating and terminating sides. The PoC system required by the OMA according to the setting of the originating and terminating sides has the following features.

First, the terminating side can set up its own answering modes according to the request of a PoC client. The answering modes can be generally divided into an auto-answer mode and a manual answer mode. In the auto-answer mode, if the terminating side is registered in an auto answer mode user list, the terminating side can immediately send an answer to the originating side in a corresponding network in place of the manual answer of a recipient. The automatic answer is sent instead of operating the terminal in the network because the PoC server has a function of storing the answering mode and the corresponding user list according to a request of the terminal to set up the answering mode. The manual answer mode corresponds to the case where the user is not included in an automatic answer user list or where the answer is ambiguous, and the case where the recipient sets up all users to make the manual answer, and a PoC call request is transmitted to the user's terminal through a terminating network and then a call is connected by acceptance of the PoC client.

Second, the PoC system is divided into two modes, an on-demand session mode and a pre-established (or early) session mode, according to how the connection with a PoC server within a user's home network is set up. The pre-established session mode is designed so that the PoC user sets up a session between a PoC client and a PoC server belonging to a PoC user's home network in advance by PoC user's request. The pre-established session is necessary to enable the PoC user to negotiate media parameters to be used with the PoC server in advance, and thus perform rapid session establishment without renegotiating the media parameters to be used between the PoC server and client again in the future.

In order to set up the pre-established session, the PoC client provides supported media parameters to a Session Description Protocol Multipurpose Internet Mail Extensions (SDP MIME) body through a SIP INVITE method, and responds to the media parameters provided from the PoC server. The PoC client sends, to the PoC user, identification information of the pre-established session which is newly set up for a response message received from the PoC server, together with a conference Uniform Resource Identifier (URI).

In the case of using the pre-established session, it is possible to pre-negotiate parameters such as an IP address, a port number, a codec to be used, a Talk Burst Control Protocol (TBCP) for controlling a talk burst, and so on. The on-demand session mode refers to a state in which the PoC user does not set up the pre-established session, and means that the PoC user performs a PoC call connecting procedure after receiving an invitation message of another PoC user.

In the PoC system, the setup of the answering mode of the call request can be stored in the PoC server and the PoC client, the user side terminal, which are the entities in the network.

When the answering mode is set up for the home network managing the PoC client, the answering mode is realized in the Participating PoC server, which performs the PF within the home network to which the PoC client belongs.

When the answering mode is set up for the network, the Participating PoC server automatically sends a session progress message to the call request network as soon as a PoC call is requested by another PoC server. Thus, when the auto-answer mode is set up, a call request procedure is simplified, compared to when a session setup message is transmitted to the PoC client and then a response is made. Thus, an initial time taken to give the floor is reduced.

However, when the auto-answer is made on the network, there is a possibility of a result not accurately reflecting a user's intentions. For this reason, the answering mode can be set up for the PoC client. At this time, the answering mode of the PoC client has priority over the answering mode set up on the network. This solves a privacy problem generated when the answering mode is not reflected in real time due to signal delay or error on the network when the PoC client changes its own answering mode and requests the PoC server to update the answering mode.

In the PoC service, the answering mode of the user can be set up for the PoC server and the PoC client, but it is determined by the PoC client which reflects the user's most recent intentions. Based on this determination, the stream of media (e.g. voice, image etc. of the actual user) can be transmitted.

A procedure of establishing a PoC multimedia session in the PoC system having the foregoing features will be described below.

An originating PoC client sends an INVITE message for multimedia (that may include various formats of audio, video and text based on designation of a media type), and thereby requests call processing. In response to this call processing, a terminating PoC client performs various answering procedures based on an answering mode setup of a corresponding PoC server, and whether a pre-established session exists. The call processing procedure for a PoC call will be described with reference to procedures of the same originating and terminating side networks, by way of example.

The originating PoC client sends an INVITE request message, which includes a SIP address of the terminating PoC client with whom the originating PoC client desires to communicate, to a corresponding SIP/IP core. At this time, the INVITE request message may include elements such as information on a PoC address of the terminating PoC client, requested media parameters, information on an attribute value indicating the PoC service, and so on. Here, the requested media parameters may include attribute values such as an encoding method of audio and video, a rate, a payload type, etc., when a requested session is based on multimedia.

The INVITE message is transmitted to a Participating PoC server (i.e. a PF) via corresponding IP Multimedia Subsystem (IMS) servers, i.e. a Proxy Call Session Control Function (P-CSCF) and a Serving Call Session Control Function (S-CSCF), in an IMS network through a route query at a Dynamic Host Configuration Protocol (DHCP) server or Domain Name System (DNS) server. Because the Participating PoC server, to which a PoC user is connected at a general call request, can be implemented as an entity different from a CF (i.e. a Controlling PoC server) that manages a talk burst of an established session, the INVITE request message sent to the Participating PoC server is delivered to the CF via an SIP/IP core of the corresponding network.

Meanwhile, a PoC session controlling network including the CF transmits the INVITE request message to a terminating side network, and then receives a response message from the terminating side network. The SIP response message received from the terminating side network may be one of a provisional response message of 1xx, a successful response message of 2xx, and an error response message of 4xx, 5xx or 6xx, according to the setup of the terminating PoC client and the PF. When the auto-answer mode is set up, a SIP 183 Session Progress signal is received as the response message. Thus, this response message allows connection between the PoC server and the PoC client to be performed in the IMS network of the call requester. A call acceptance signal of the terminating PoC client is sent as the SIP 183 Session Process or SIP 200 OK response and forwarded to the PoC client via the PoC servers, the CF and the PF. When the SIP 200 OK or SIP 183 Session Progress signal is received from the terminating PoC server, the CF determines that a PoC call is connected, and then sends a Floor Granted signal for giving a talk burst floor to the originating PoC client. Granting of the talk burst according to the response, i.e. the SIP 200 OK or SIP 183 Session Progress signal, can be divided into two types: Confirmed and Unconfirmed. When the CF receives the "Unconfirmed" response, a buffering function is required.

Meanwhile, after receiving the response signal to the INVITE request signal, the originating PoC client A receives the Floor Granted signal forwarding a talk burst transmission enable signal (e.g. a ring back tone) using a Real-time Transport Protocol (RTP) Control Protocol (RTCP). At this time, the Floor Granted signal is generated from the CF having a right to arbitrate the talk burst, and transmitted to the corresponding PoC client via the PF, which manages the corresponding PoC client. The Floor Granted signal can be transmitted without passing through the SIP/IP core because of the use of a bearer's route rather than the SIP. Finally, the PoC user who confirms the ring back tone transmits a media stream (e.g. voice) using Real-time Transport Protocol (RTP).

Figure 4:
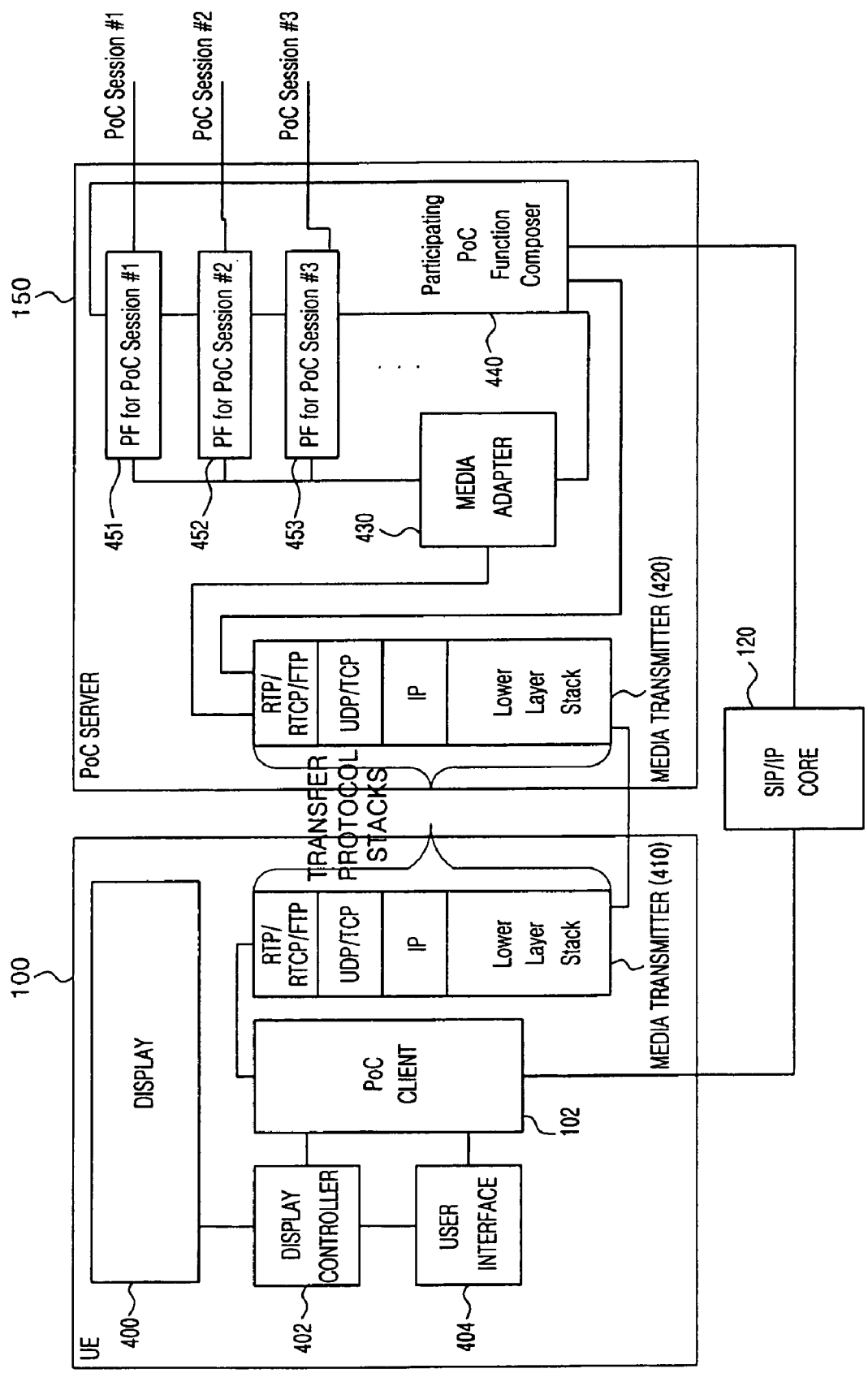
FIG. 4 illustrates blocks of a PoC terminal and a PoC server constructing a system of the present invention.

Application of the present invention to the PoC system will now be described with reference to FIG. 4, which illustrates blocks of a PoC terminal and a PoC server constructing a system of the present invention. The system of the present invention comprises a UE 100, a PoC server 150, and a SIP/IP core 120. Components of each of the PoC server 150 and the UE 100 will be described below.

The PoC server 150 can act as a CF and PF whether or not it owns a group session. Herein, only a PF controlling multi-sessions for a multimedia PoC call will be considered. Further, the PoC server 150 can perform a function of media adaptation. Media adaptation is for preventing overload of the PoC network due to increased media stream transmission by providing simultaneous multiple PoC multimedia service. Media adaptation functions to adapt a size of each media stream transmitted through the PoC session.

The PoC server 150 includes a media transmitter 420, a media adapter 430 handling simultaneous multiple PoC multimedia service, and a participating PoC function (PF) composer 440.

The media transmitter 420 exchanges packet data and includes protocol stacks for exchanging the packet data. The media adapter 430 provides simultaneous multiple PoC multimedia service for simultaneously transmitting a plurality of media to a corresponding PoC client by request of the PoC client, and adapts a media stream size, etc. of multiple PoC sessions connected to the corresponding PoC client when providing the simultaneous multiple PoC multimedia service. Further, the media adapter 430 outputs the adapted media data to the media transmitter 420. The PF composer 440 is used for supporting the multiple PoC sessions, and manages each of the multisessions. Further, the PF composer 440 outputs the media data received through the multiple PoC sessions 451, 452, 453 . . . to the media adapter 430.

The PoC server 150 can be connected to the PoC client through the SIP/IP core 120 supporting SIP-based communication.

The UE 100 comprises a PoC client 102, a display 400, a display controller 402, a user interface 404, and a media transmitter 410.

The PoC client 102 makes a request for provision of the simultaneous multiple PoC multimedia service as well as media adaptation to a Participating PoC server through a SIP or RTCP message, performs media adaptation on each media session through a function of the PF composer (herein, its functional blocks are not separately illustrated), and transmits the media data to a mobile communication network. Further, the PoC client controls the display controller 402 to adjust display of a corresponding media stream and displays the received media to a user.

The display 400 outputs visual media (e.g. images, video, etc.) received from the PoC server 150. The display controller 402 performs data processing for outputting the received data to the display 400. The display 400 and the display controller 402 support the multimedia. The user interface 404 delivers inputs of the user to the UE 100. The user interface 404 of the present invention allows the PoC client to can change a display type by request of the PoC user. The media transmitter 410 exchanges packet data and includes IP-based network protocol stacks for exchanging the packet data.

In the foregoing system of the present invention, the UE 100 requests media adaptation based on a command of the user when the same multimedia session is requested. The PoC server 150 performs media adaptation on the multisessions in response to the request from the UE 100, and transmits the media data subjected to media adaptation to the corresponding UE 100. At this time, the UE 100 can transmit to the PoC server 150 an indicator of a corresponding media type when requesting media adaptation and an indicator designating the multimedia session for adapting the media type.

Meanwhile, the present invention can be realized by using SIP or RTCP messages during the connected PoC session. The former technique can be realized by newly defining Media Burst Control Protocol (MBCP) MIME parameters included in the SDP body part of the SIP, while the latter technique can be realized by defining the MBCP message transmitted through the RTP/RTCP channel connected after the SIP session is established.

Next, processes performed by the UE 100 and the PoC server 150 will be described with reference to the flowchart of FIG. 5, which illustrates a process performed by a PoC client for providing simultaneous multiple PoC multimedia service in accordance with the present invention.

Figure 5:
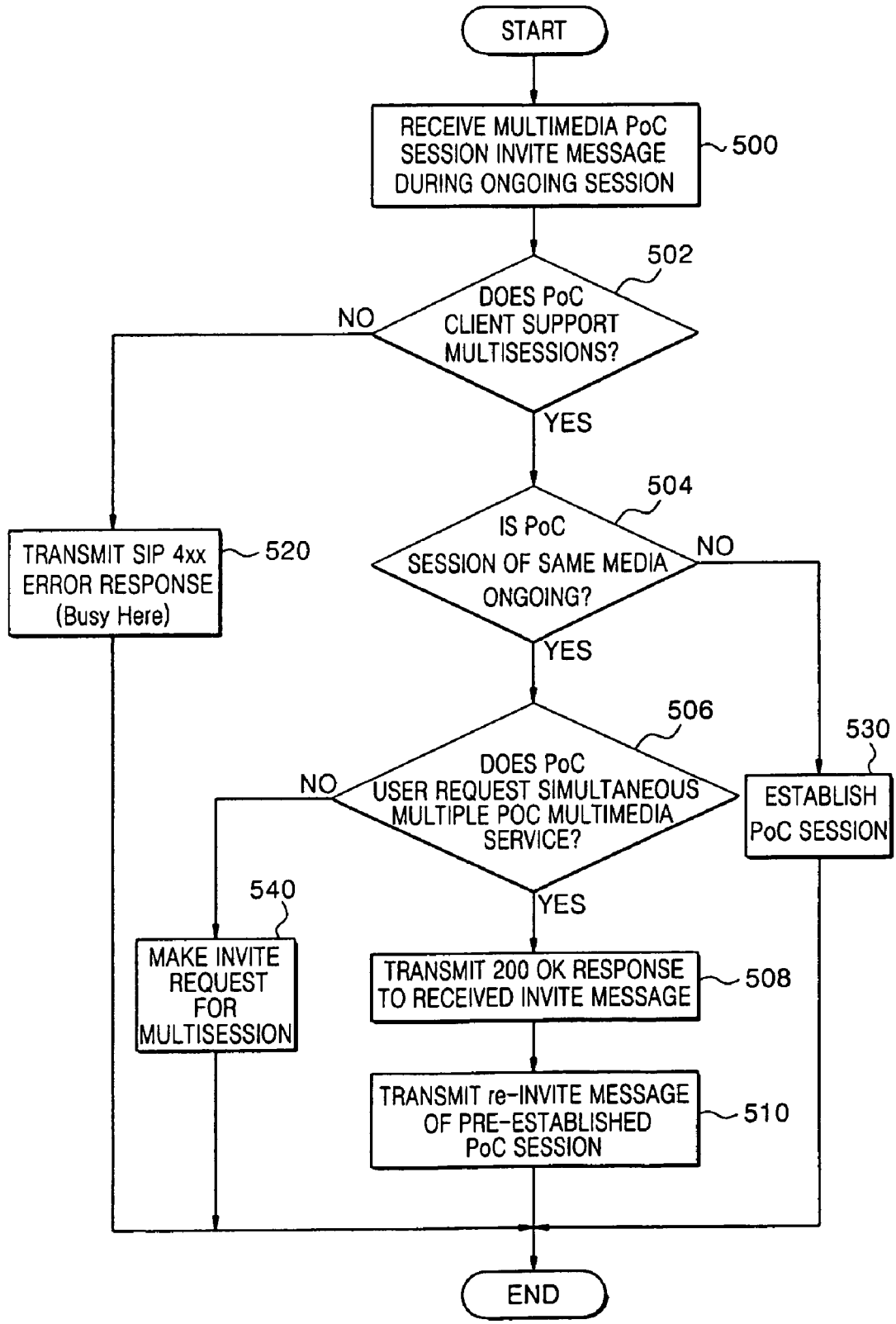
FIG. 5 is a flowchart illustrating a process performed by a PoC client for providing simultaneous multiple PoC multimedia service in accordance with a first embodiment of the present invention.

As illustrated in FIG. 5, when receiving an INVITE message of a new multimedia PoC session (S500), the PoC client that is participating in the pre-established PoC session determines whether it supports multisessions (S502). If the PoC client supports multisessions, it determines whether a type of media supported by the pre-established PoC session is identical to that supported by the newly requested PoC session. However, if the PoC client does not support multisessions, it transmits a "Busy Here" message, a SIP "486" error response message, to the PoC server 150 (S520).

In step S504, if the type of media supported by the pre-established PoC session is identical to that supported by the newly requested PoC session, the PoC client determines whether the PoC user requests simultaneous multiple PoC multimedia service (S506). If the PoC user requests the simultaneous multiple PoC multimedia service, the PoC client responds to the INVITE message received in step S500 with the request of the simultaneous multiple PoC multimedia service (S508). Further, the PoC client transmits a re-INVITE message of the pre-established PoC session, then performs media adaptation on video or images within the pre-established session. Meanwhile, in step S504, if the media types supported by the two sessions are not identical, the PoC client follows a procedure for an ordinary PoC session (S530).

If the PoC service user does not request the simultaneous multiple PoC multimedia service, the same INVITE request as in the ordinary multisession establishment is performed (S540).

Figure 6:
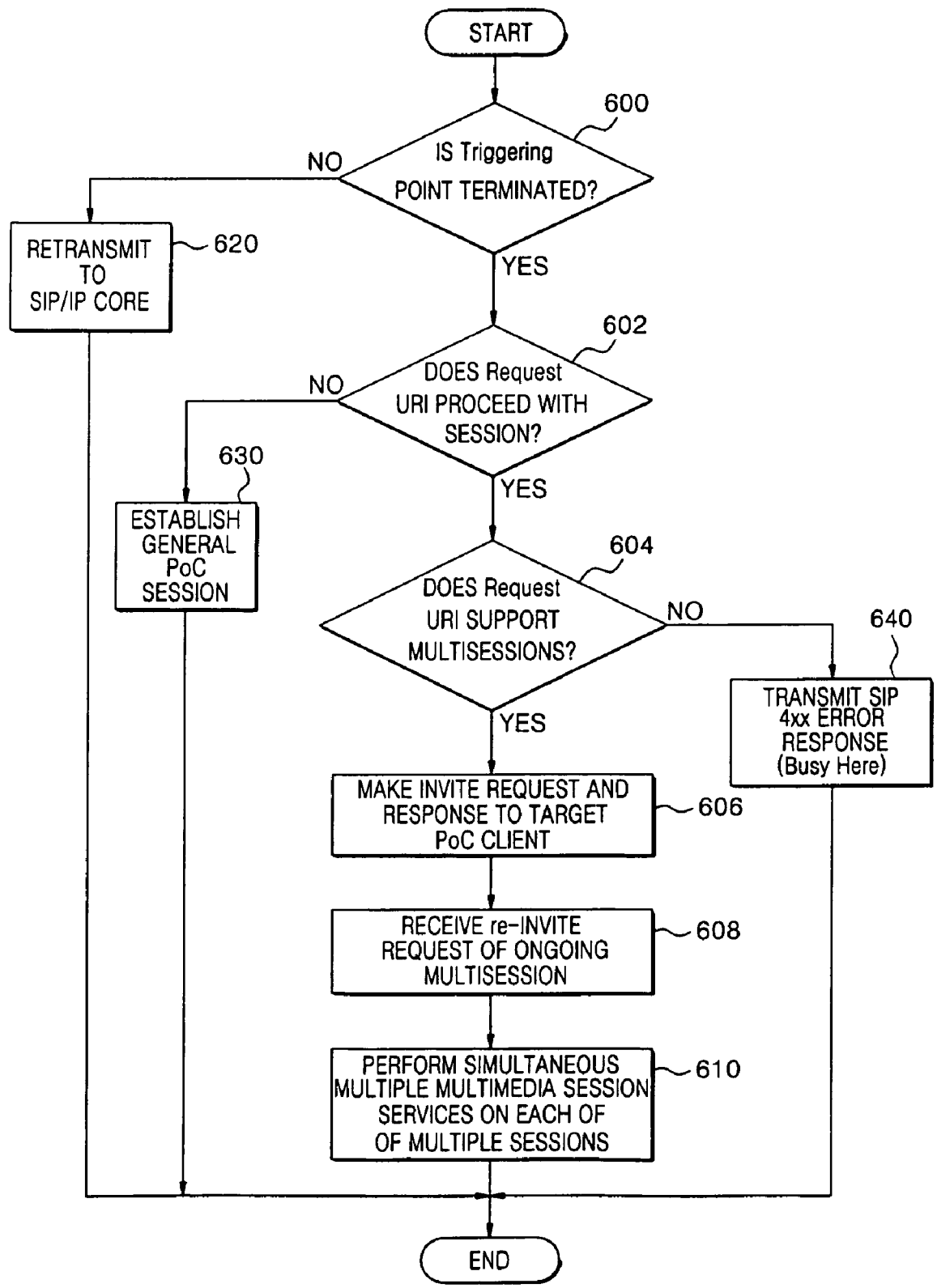
FIG. 6 is a flowchart illustrating a process performed by a PoC server for providing simultaneous multiple PoC multimedia service in accordance with a second embodiment of the present invention.

FIG. 6 is a flowchart illustrating a process performed by a PoC server for providing simultaneous multiple PoC multimedia service (particularly a terminating PoC server (PF)) in accordance with another embodiment of the present invention.

As illustrated in FIG. 6, when receiving an INVITE message, the PoC server 150 performs a triggering point test in which it is determined whether the INVITE message adopts the PoC client as a destination (S600). As a result of the triggering point test, if the destination of the INVITE message is not the PoC client, the PoC server re-transmits the INVITE message to the SIP/IP core 120 (S620).

However, if the destination of the INVITE message is the PoC client, the PoC server 150 determines whether the PoC client adopted as the destination of the INVITE message proceeds with the session (S602). If the corresponding PoC client does not proceed with the session, the PoC server 150 establishes an ordinary PoC session for the corresponding PoC client (S630). In step S602, if the corresponding PoC client proceeds with the session, the PoC server 150 determines whether the corresponding PoC client supports multisessions (S604).

In steps S602 and S604, the PoC server 150 can raise a query to the corresponding PoC client or refer to pre-stored PoC service setting information of the corresponding PoC client in order to determine whether the corresponding PoC client proceeds with the session and whether the corresponding PoC client supports multisessions. Especially, in the case in which the above-described answering mode is set up, the PoC server 150 can refer to the pre-stored information for the determination of steps S602 and S604. Of course, the PoC server 150 can obtain and store PoC service setting information of each PoC client in advance even when the answering mode is not set up. The process of FIG. 5 is illustrative of an embodiment corresponding to the case in which the PoC server 150 raises a query to the PoC client for the determination of steps S602 and S604.

In step S604, if the corresponding PoC client does not support the multisessions, the PoC server 150 transmits a "Busy Here" message, a SIP "486" error response message, to the terminating side of the INVITE message (S640). However, if the corresponding PoC client supports multisessions, the PoC server 150 transmits the INVITE request message to the corresponding PoC client (S606), and receives its response. Then, the PoC server 150 receives a re-INVITE message that requests media adaptation on the ongoing sessions from the corresponding PoC client (S608). The PoC server 150 performs simultaneous multiple PoC multimedia service, i.e., transmits a plurality of PoC multimedia streams, which are subjected to media adaptation corresponding to the re-INVITE message received in step S608, to the corresponding PoC client (S610).

FIG. 7 illustrates the flow of SIP-based signals between a PoC client and a PoC server in order to provide simultaneous multiple PoC multimedia service in accordance with the present invention.

FIG. 7 shows a case in which a PoC client A 102-A participating in one multimedia PoC session 700 supporting audio or video is requested to join a new multimedia session from a PoC client C 102-C, wherein the audio or video is managed by a PoC server X 150-X via a PoC server (Participating) A 150-A and is intended for a PoC client B 102-B. Meanwhile, the present invention can be equally applied to a case in which there are numerous pre-established PoC sessions. Further, FIG. 7 illustrates a case in which a PoC server obtains information required to determine whether a corresponding PoC client proceeds with the session and whether the corresponding PoC client supports multisessions by raising a query to the corresponding PoC client.

A PoC client A receives an INVITE message 702 requesting establishment of a PoC session for multimedia including audio or video from a PoC client C. The INVITE message 702 transmitted by the PoC client C is transmitted to a PoC server (Participating) A 150-A via a PoC server (Participating) C 150-C and a PoC server (Controlling) Y 150-Y which are connected to the PoC client C. Of course, details of the INVITE message 702 may vary slightly, such as routing information while passing through the PoC client C, the PoC server C, the PoC server Y, and the PoC server A. Thus, details and distinguished reference numbers of the INVITE message 702 will be omitted because they are irrelevant to the subject matter of the present invention.

In the present embodiment, the PoC server A transmits the INVITE message 702 to the corresponding PoC client in order make a query about whether the corresponding PoC client proceeds with the session and whether the corresponding PoC client supports multisessions.

Step S704 of FIG. 7 can be considered to correspond to steps S502 and S504 of FIG. 5. The PoC client A receiving the INVITE message from the PoC server A determines whether it itself supports multisessions and whether the pre-established PoC session and the newly requested PoC session support the same media type (S704). The PoC client A includes the results of step S704 in a 200 OK message 706 and transmits the 200 OK message 706 to the PoC server A. The PoC server A includes a response to whether to establish the request PoC session in the 200 OK message 706 according to information received from the PoC client A, and transmit the 200 OK message 706 to the PoC client C. The 200 OK message 706 can be transmitted to the PoC client via the PoC server Y and the PoC server C. Here, the 200 OK message 706 can be assumed to be a message accepting the corresponding session request.

When the PoC client A determines that it supports multi-sessions and that a user desires to be provided with the simultaneous multiple PoC multimedia service, the PoC client A requests media adjust of the connected multisessions (S708). This request can be transmitted to the PoC server A through a re-INVITE message 710, a SIP message. The re-INVITE message 710 can include an indicator requesting media adaptation, a media type intended for media adaptation, a transmission connection direction (uplink or downlink), information about a session for performing media adaptation, etc.

Meanwhile, the above-defined parameters can be included in a 200 OK response signal, and then transmitted so as to be compatible with standard SIP. In step S708, the re-INVINTE message requesting the media adjust only with respect to a previously ongoing session 700 is transmitted. It will be easily understood that if the parameters are not included in the 200 OK message, the re-INVITE message as in steps S710 to S712 of FIG. 7 is also transmitted with respect to the session established in steps S702 to S706.

The PoC server A receiving the re-INVITE message 710 transmits a 200 OK message 712 reporting that the corresponding message is received to the PoC client A.

The PoC client A performs display adaptation (S714). The display adaptation is performed to determine how to display media streams at the PoC client A. In the present invention, the display adaptation can be used as one of the conditions of media adaptation. In other words, the PoC client A is allowed to perform media adaptation considering a display type. Accordingly, the PoC server A is to determine a size of each media stream to be transmitted to the PoC client A by reflecting the display type determined through the display adaptation at the corresponding PoC client A. For example, when the plurality of media streams are all displayed with the same size, media adaptation can be performed so that all the media streams have the same size. On the other hand, when the plurality of media streams are each displayed with a different size, media adaptation can be performed so that each of the media streams has a size proportional to the displayed size. In addition, it is natural that media adaptation can be performed according to various conditions such as a user's choice, a pre-defined setup, etc.

In the present invention, the total size of the media streams provided to one PoC client at the same time can be determined in consideration of transmission capacity of the PoC system. In general, the transmission capacity used for providing one PoC client with the simultaneous multiple PoC multimedia service can be set to be equal to that used for providing one PoC client with a single PoC multimedia service. This can be easily understood from the purpose of media adaptation, which is intended to prevent an excessive load from being applied due to the provision of the simultaneous multiple PoC multimedia service. Of course, this is merely an example of an application of the present invention and is not intended to limit the scope of the invention.

The PoC client receiving the 200 OK message 706 transmits an ACK message 718 in response to the 200 OK message 706.

The PoC client A and the PoC client B performing PoC multimedia communication with the PoC client A through the pre-established PoC session 700 perform setup for the simultaneous multiple PoC multimedia service to be performed in the future by exchanging TBCP TB Taken and TB Confirmed messages 720. Thereafter, media 722 is transmitted between the PoC client A and the PoC client B based on the adaptation by the exchange of the TBCP TB Taken and TB Confirmed messages 720. Meanwhile, the PoC server A performs media adaptation on the media stream received from the PoC client B in response to the request of the PoC client A (S724). Then, the PoC server A transmits the media subjected to media adaptation to the PoC client A.

Further, the PoC client A and the PoC client C perform setup for the simultaneous multiple PoC multimedia service to be performed in the future by exchanging TBCP TB Taken and TB Confirmed messages 728. Thereafter, media 730 is transmitted between the PoC client A and the PoC client C based on the media adaptation (S724) by the exchange of the TBCP TB Taken and TB Confirmed messages 728. Meanwhile, the PoC server A performs media adaptation on the media stream received from the PoC client C in response to the request of the PoC client A (S732). Then, the PoC server A transmits the media subjected to media adaptation to the PoC client A.

After media adaptation is performed, the PoC client A can drive a display suitable for the transmitted media, and receive and display the multimedia stream subjected to media adaptation at the PoC server (Participating).

The present invention has been described with reference to its application to the downlink, but it can be applied to the uplink as well. When applied to the uplink, the present invention is designed so that one PoC client can transmit a plurality of media streams at the same time.

As described above, the present invention can be performed through SIP or RTCP. Even when RTCP is used, a process of making a SIP response to the INVITE message is the same as when SIP is used. However, when RTCP is used, media adaptation can be requested from the PoC client to the PoC server (Participating) by transmitting a TBCP or MBCP message through an RTCP channel of independently established multisessions. Meanwhile, a procedure of performing media adaptation using the RTCP message can be replaced by a procedure of transmitting an RTCP message to the established session instead of steps S710 and S712 of FIG. 7, and thus additional drawings will be omitted.

Next, the format of a message used for application of the present invention will be described.

First, the format of a SIP message will be described.

In the present invention, SIP-based MBCP MIME parameters can be assigned as the type illustrated in FIG. 8. Among the MBCP MIME parameters of FIG. 8, a "TBCP" parameter value, a format value of an application media type introduced to support the PoC system, is additionally expanded. Here, TBCP can be converted into MBCP in order to indicate the support of multimedia in the future. A conventional system sets parameters, such as queue, timestamp, tb_priority, etc., as attributes of a TBCP format. In the present invention, in consideration of a transmission environment of the multimedia multisession between the PoC server (Participating) and the PoC client, a new TBCP option parameter is proposed. The new TBCP option parameter is referred to as "mb_adapt." However, the present invention is not limited by this terminology, and can be applied to all parameters having the same function regardless of the terminology used.

The present embodiment is illustrative of the case in which a field value of "mb_adapt" is set to a range of 0-4. Each field value of "mb_adapt" has a meaning as follows:

When a "mb_adapt" field is omitted or when the field value of "mb_adapt" is "0," it means there is no request for media adaptation;

When the field value of "mb_adapt" is "1," it means there is a request for media adaptation, video, and downlink;

When the field value of "mb_adapt" is "2," it means there is a request for media adaptation, image, and downlink;

When the field value of "mb_adapt" is "3," it means video and uplink; and

When the field value of "mb_adapt" is "4," it means image and uplink.

Referring to the above-described settings of "mb_adapt," the TBCP option parameter value, the "mb_adapt" field value, included in the MIME body part is "2" in FIG. 8. Thus, it can be found that the PoC server (Participating) is requested to transmit the image stream in a download direction after media adaptation.

In addition, although omitted in the embodiment, visual media can include "text," and be defined as a media type of the simultaneous multiple PoC multimedia service by expanding the "mb_adapt" field values.

The TBCP option parameter 'mb_adapt' is included in an SIP session modification message by the PoC Client for suggestion of simultaneous multiple reception for specific media. Accordingly, the PoC server may transmit an ACK message including the 'mb_adapt' so that overlapped media (audio and video) are simultaneously transmitted to the PoC client through a multisession. Further, the media adaptation may be performed according to a value of the TBCP option parameter 'mb_adapt'.

Meanwhile, the MIME parameters can be used in the SIP response message because they are compatible with a general SIP function, thereby requesting a media adaptation function. In this case, the originating PoC server or client includes an 'mb_adapt' response value in the ACK message so that simultaneous multiple reception and media adaptation are performed. For example, in FIG. 7, the PoC client A inserts the above-mentioned MIME parameters into the 200 OK message 706 transmitted to the PoC server (Participating), thereby requesting media adaptation of the corresponding PoC session from the PoC server (Participating). When the SIP response signal is used, there is an advantage that no re-INVITE request is made to the corresponding session that makes a response.

FIG. 9 illustrates the format of an RTCP message transmitted through a PoC session in order for a PoC client to request media adaptation from a PoC server (Participating).

A first line indicates information on version, subtype, packet type, packet length, etc. A second line includes information on an address of a PoC server (Participating) that performs media adaptation. A third line indicates a PoC release version. A fourth line indicates a media adaptation type, the following bits of which can be assigned as a zero padding value. A fifth line indicates Source Description (SDES) item content for representing information on a "PoC Session Identity" for identifying the PoC session performing media adaptation. The SDES item content may use an additional information field for future expansion. Information on an actual SIP URI for the SDES item included in the fifth line is assigned from a sixth line to the last line, thereby designating the PoC session for media adaptation. Each line mentioned above has a size of 32 bits.

Figure 10:
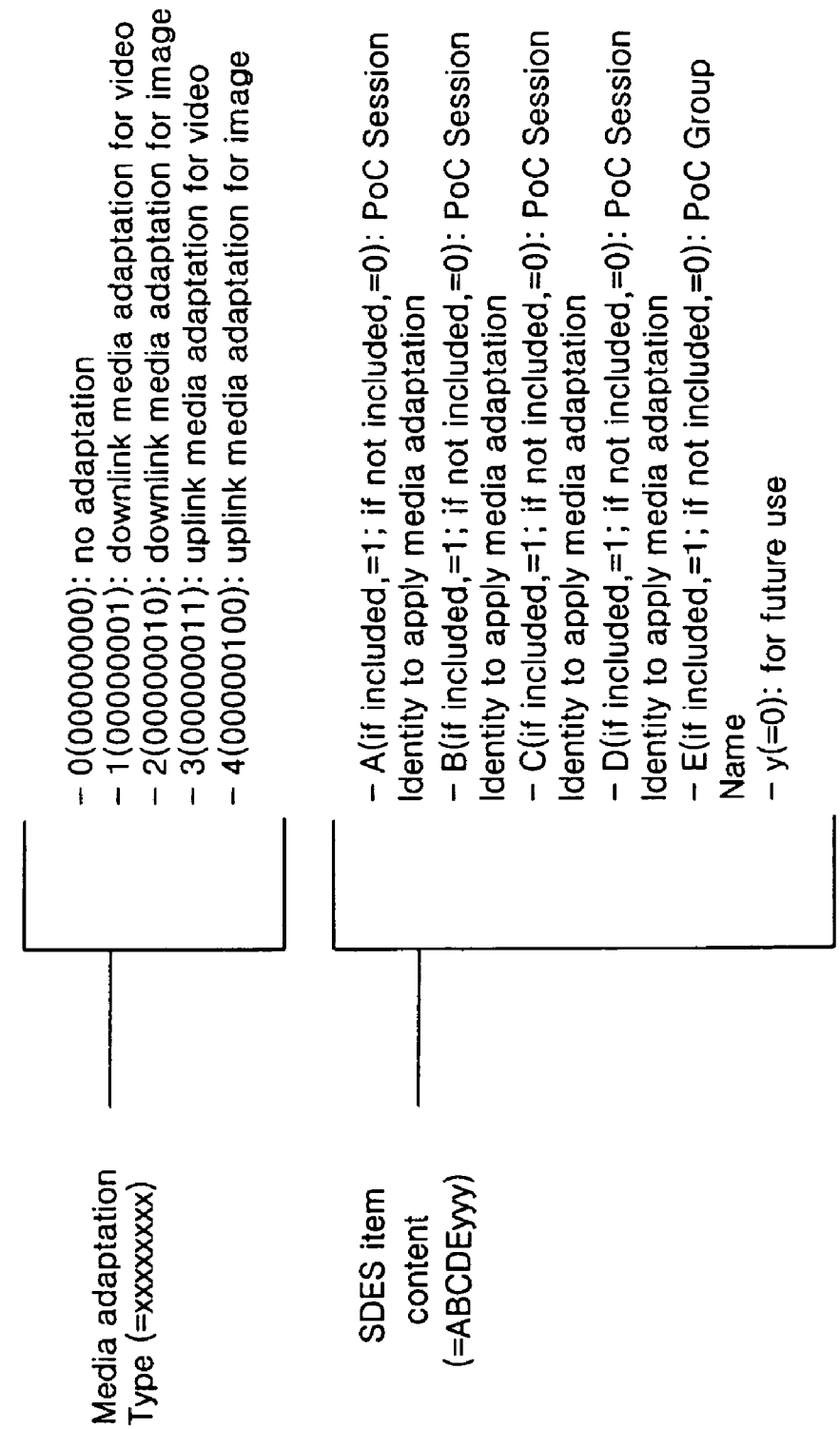
FIG. 10 illustrates a parameter format and values included in SDES item content and SDES items illustrated in FIG. 9.

FIG. 10 illustrates a parameter format and values included in SDES item content and SDES items illustrated in FIG. 9.

A media adaptation type can have values ranging from 0 to 4 and indicates adaptation at the time of downlink/uplink of video/image. Further, SDES item content can be expressed in binary according to whether an identity of each session intended to perform the adaptation is included. For example, the SDES item content can be expressed by "1" when the target session exists and by "0" when the target session does not exist.

Although omitted in the embodiment, visual media may include "text," and request the simultaneous multiple PoC multimedia service by expanding the range of field values of media adaptation type of the RTCP message to define the downlink/uplink of the text. This should be interpreted to be included in the subject matter of the present invention.

According to the present invention as described above, multiple PoC multimedia service can be simultaneously provided to one PoC client. Further, it is possible to reduce load on the PoC system due to increased transmission by means of media adaptation of each of the media streams provided to one PoC client at the same time.

As described above, when the PoC client participating in the multimedia PoC call is requested to participate in the session including the same video/image media, the multimedia streams are adapted to be simultaneously transmitted and displayed from the multiple PoC sessions. Thereby, at least two video or image streams can be simultaneously displayed on one terminal. Particularly, by reducing a size of the media stream transmitted to the terminal, it is possible to improve efficiency of wireless transmission and save cost to the PoC service user.

While the present invention has been described with reference to the exemplary embodiments, it should be understood to those skilled in the art that various other modifications and changes may be provided within the spirit and scope the present invention defined in the following claims.

What is claimed is:

1. A method for providing simultaneous multiple multimedia service, the method comprising the steps of:
   receiving a request for establishment of at least two multimedia sessions of a terminal performing multimedia service;
   determining whether the terminal supports simultaneous multiple multimedia sessions;
   determining whether a pre-defined setup of the terminal is set when the terminal supports multiple multimedia sessions, the pre-defined setup being for adjusting sizes of at least two multimedia data to be transmitted through the simultaneous multiple multimedia sessions;
   adjusting sizes of the at least two multimedia data to be transmitted to the terminal based on the pre-defined setup when the pre-defined setup of the terminal is set, the adjusted sizes of the multimedia data being adapted to provide simultaneous multiple multimedia service; and
   transmitting the adjusted data to the terminal.

2. The method according to claim 1, wherein the step of determining whether the terminal supports the simultaneous multiple multimedia sessions comprises:
   transmitting a message querying whether the terminal supports the simultaneous multiple multimedia sessions; and
   receiving a response message to the query message from the terminal, detecting information included in the response message, and determining whether not the terminal supports the simultaneous multiple multimedia sessions.

3. The method according to claim 2, wherein the query message and the response message are transmitted using Session Initiation Protocol (SIP) or Real-time Transport Control Protocol (RTCP).

4. The method according to claim 1, wherein the pre-defined setup is based on the number of multimedia sessions that are provided at the same time.

5. The method according to claim 1, wherein the pre-defined setup is based on a type of display of the terminal.

6. The method according to claim 1, wherein the media adaptation is carried out based on a preset rule including at least one of a maximum number of displays, a division ratio of display, and a screen size.

7. The method according to claim 1, further comprising receiving a request for the media adaptation from the terminal.

8. The method according to claim 2, wherein the response message comprises a Session Initiation Protocol (SIP) message having Talk Burst Control Protocol (TBCP) option parameters indicating whether media adaptation is requested, whether an uplink or downlink exists, and a type of media data.

9. An apparatus for providing simultaneous multiple multimedia service, the apparatus comprising:
   a participating composer for outputting at least two multimedia data received through at least two multimedia sessions;
   a media adapter for determining whether a terminal supports simultaneous multiple multimedia sessions, determining whether a pre-defined setup of the terminal is set when the terminal supports multiple multimedia sessions, and adjusting sizes of the at least two multimedia data to be transmitted to the terminal based on the pre-defined setup when the pre-defined setup of the terminal is set, the pre-defined setup being for adjusting sizes of at least two multimedia data to be transmitted through simultaneous multiple multimedia sessions, and the adjusted size of the multimedia data being adapted to provide simultaneous multiple PoC multimedia service; and
   a media transmitter for transmitting the multimedia data adjusted by the media adapter to the terminal.

10. The apparatus according to claim 9, wherein the at least two multimedia sessions connected to a terminal include at least one pre-established multimedia session and a multimedia session that is newly requested before the pre-established multimedia session is terminated.

11. The apparatus according to claim 9, wherein the media adapter performs media adaptation on the media data transmitted to the terminal that supports simultaneous multiple multimedia sessions and requests the media adaptation.

12. The apparatus according to claim 11, wherein the media adapter performs query and response with a corresponding terminal in order to determine whether the corresponding terminal supports the simultaneous multiple multimedia sessions and identify whether there is a request for media adaptation from the terminal.

13. The apparatus according to claim 12, wherein the query and response are performed using Session Initiation Protocol (SIP) or Real-time Transport Control Protocol (RTCP).

* * * * *